United States Patent
Sasaki et al.

(10) Patent No.: US 6,926,845 B2
(45) Date of Patent: Aug. 9, 2005

(54) ROOF OPENING AND CLOSING DEVICE

(75) Inventors: Toshiyuki Sasaki, Kariya (JP); Kenichiroh Hayashi, Okazaki (JP); Teruhisa Katoh, Anjo (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 9 days.

(21) Appl. No.: 10/374,066

(22) Filed: Feb. 27, 2003

(65) Prior Publication Data

US 2003/0230907 A1 Dec. 18, 2003

(30) Foreign Application Priority Data

Feb. 27, 2002 (JP) ...................................... 2002-051225

(51) Int. Cl.⁷ ................................................ B60J 7/08
(52) U.S. Cl. ............................. 216/107.07; 216/107.17
(58) Field of Search ....................... 296/107.07, 107.01, 296/108, 107.16, 107.17

(56) References Cited

U.S. PATENT DOCUMENTS

| | | | |
|---|---|---|---|
| 6,131,988 A | 10/2000 | Queveau et al. | |
| 6,454,342 B2 * | 9/2002 | Heselhaus et al. | 296/107.07 |
| 6,485,085 B1 * | 11/2002 | Pecho et al. | 296/107.07 |
| 6,702,362 B2 * | 3/2004 | Eichholz et al. | 296/108 |
| 6,722,724 B1 * | 4/2004 | MacFarland | 296/107.17 |
| 6,742,829 B2 * | 6/2004 | Reihl | 296/108 |
| 2002/0005653 A1 * | 1/2002 | Heselhaus et al. | 296/107.07 |
| 2002/0175536 A1 * | 11/2002 | Biecker et al. | 296/107.07 |

FOREIGN PATENT DOCUMENTS

| | | | |
|---|---|---|---|
| DE | 199 36 252 A1 | 2/2001 | |
| JP | 61247515 | * 11/1986 | 296/108 |
| JP | 01111525 | * 4/1989 | 296/108 |

* cited by examiner

*Primary Examiner*—H. Gutman
(74) *Attorney, Agent, or Firm*—Burns, Doane, Swecker & Mathis, LLP

(57) ABSTRACT

A roof opening and closing device includes a roof panel for opening and closing a roof of a vehicle body and disposed over the vehicle for closing the roof at its mounting position, a back window having a back window frame and a back window glass and disposed rearwards of the roof panel at its mounting position, a first displacement mechanism for displacing the roof panel and the back window from their mounting position to their storage position being stowed in a luggage room in order to open the roof and a second displacement mechanism for contacting a front end portion and a rear end portion of the back window glass in the longitudinal direction of the vehicle body to the back window frame at the mounting position of the roof panel and the back window and for displacing the front end portion and the rear end portion of the back window glass upwards in relation to the back window frame.

2 Claims, 6 Drawing Sheets

ROOF OPENING AND CLOSING DEVICE

CROSS REFERENCE TO RELATED APPLICATIONS

This application is based on and claims priority under 35 U.S.C. §119 with respect to a Japanese Patent Application 2002-051225, Filed on Feb. 27, 2002.

FIELD OF THE INVENTION

This invention relates to a roof opening and closing device which displaces a roof panel and a back window from their mounting position closing a roof of a vehicle to their storage position opening the roof and which displaces the roof panel and the back window from their mounting position to the storage position.

BACKGROUND OF THE INVENTION

A German Patent Laid-Open Publication DE 199 36 252 A1 discloses a roof opening and closing device of this kind. This known device includes a displacement mechanism which displaces a roof panel and a back window having a back window frame and a back window glass via a guide and links. The displacement mechanism overlaps the roof panel over the back window and displaces them so as to be stowed in a luggage room. In this roof opening and closing device, a back window glass of the back window is displaced upwards in relation to a back window frame by the link driven by the displacement mechanism when the roof panel and the back window are stowed in the luggage room. Thereby, a usable space in the luggage room is enlarged.

In the above device, an one end of the back window glass is rotatably connected to an one end of the back window frame and the link rises only the other end of the back window. Therefore, the height of one end of side of the back window glass is the same as the height of the back window frame and the usable space in the luggage room can be not enlarged sufficiently.

A need thus exists for a roof opening and closing device which can enlarge the usable space in the luggage room in which the roof panel and the back window are stowed.

SUMMARY OF THE INVENTION

In light of the foregoing, the present invention provides a roof opening and closing device which includes a roof panel for opening and closing a roof of a vehicle body and disposed over the vehicle for closing the roof at its mounting position, a back window having a back window frame and a back window glass and disposed rearwards of the roof panel at its mounting position, a first displacement mechanism for displacing the roof panel and the back window from their mounting position to their storage position being stowed in a luggage room in order to open the roof and a second displacement mechanism for contacting a front end portion and a rear end portion of the back window glass in the longitudinal direction of the vehicle body to the back window frame at the mounting position of the roof panel and the back window and for displacing the front end portion and the rear end portion of the back window glass upwards in relation to the back window frame.

BRIEF DESCRIPTION OF THE DRAWING FIGURES

A more complete appreciation of the invention and other advantages thereof will be readily obtained as the same becomes better understood by reference to the following detailed description when considered in connection with the accompanying drawings, in which.

DETAILED DESCRIPTION OF THE INVENTION

Having generally described the present invention, a further understanding of the invention can be obtained now according to embodiments of the present invention with reference to FIGS. 1 to 6 in accompanying drawings.

Figure 1:
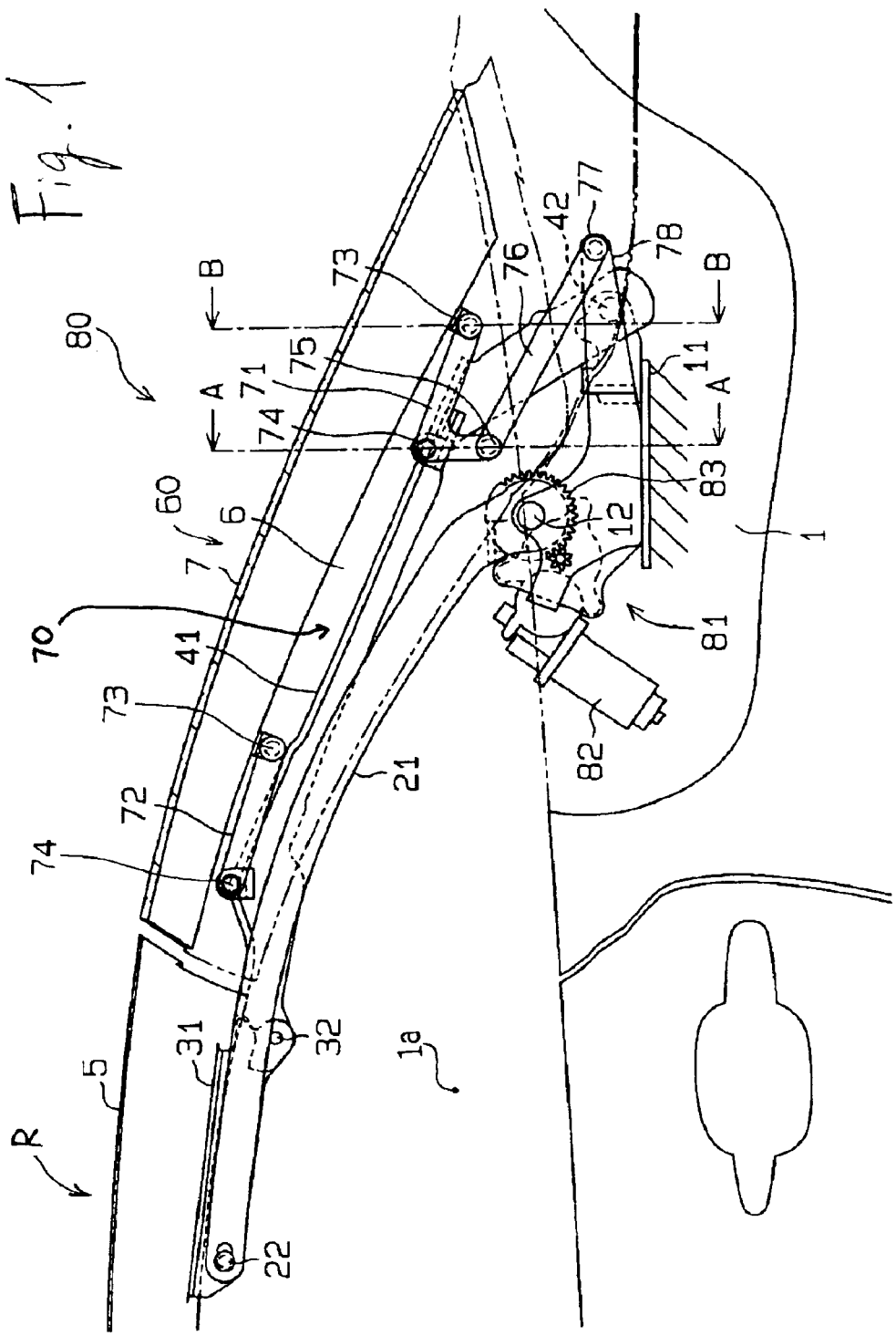
FIG. 1 is a side view of a roof opening and closing device according to a first embodiment of the present invention in which a roof panel and a back window are in the mounting position.
Figure 2:
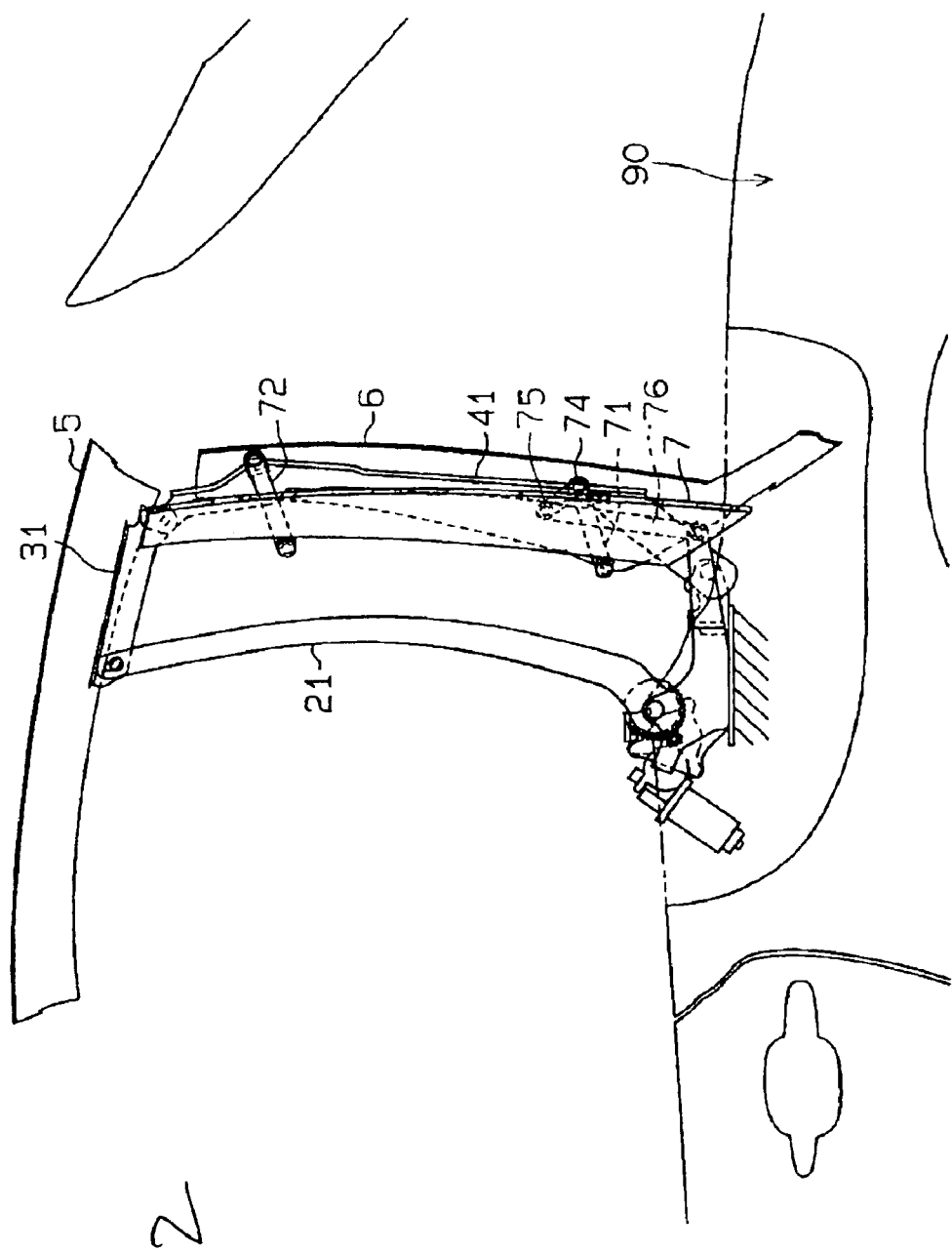
FIG. 2 is a side view of a roof opening and closing device according to the first embodiment of the present invention in which the roof panel and the back window are in a process from the mounting position to the storage position.
Figure 3:
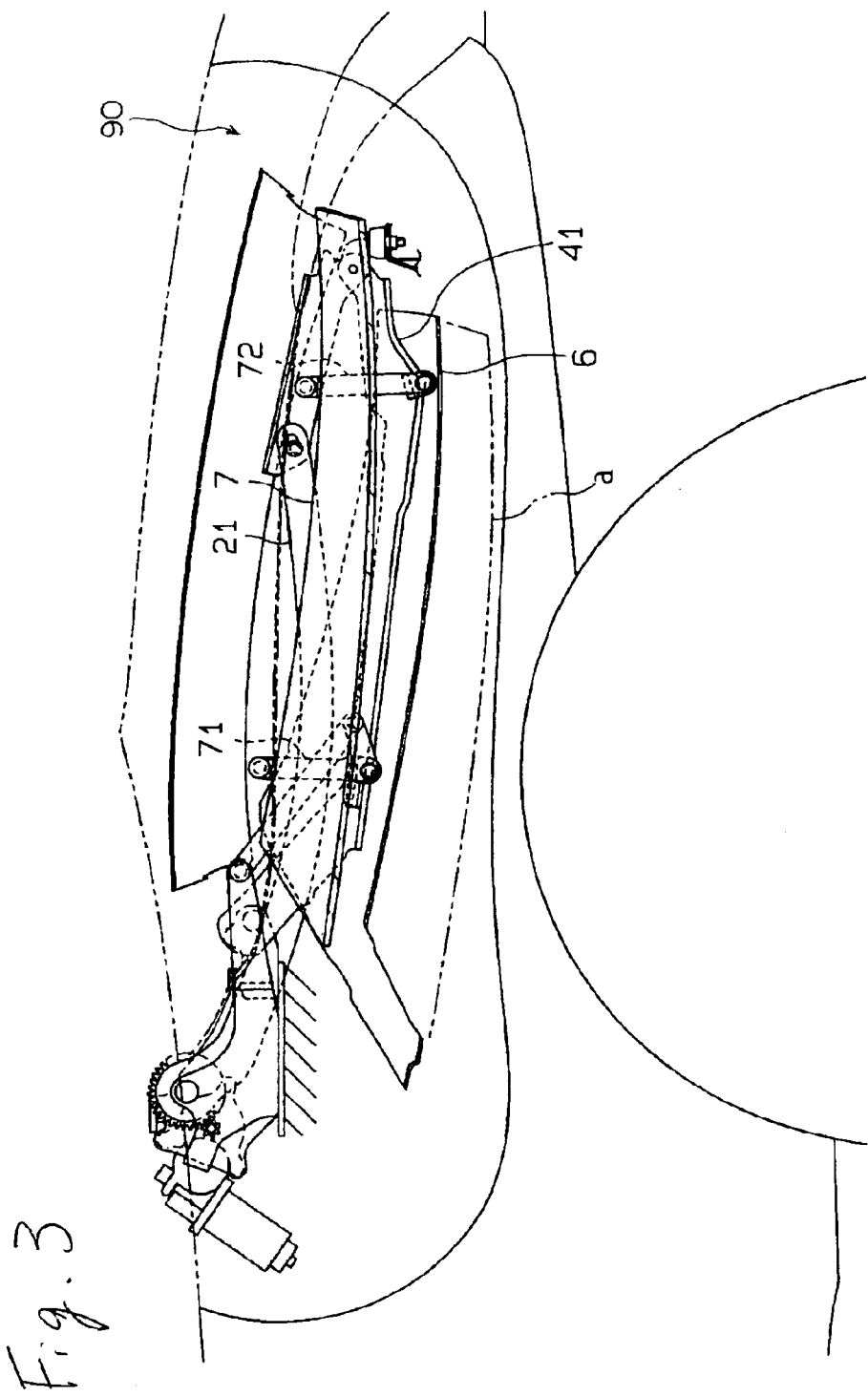
FIG. 3 is a side view of a roof opening and closing device according to a first embodiment of the present invention in which a roof panel and a back window are in the storage position.

Referring to FIG. 1, a roof opening and closing device 80 includes a roof panel 5, a back window 60, a first displacement mechanism 81 and a second displacement mechanism 70. FIG. 1 shows the mounting position of the roof panel 5 and the back window 60 in which a roof R of a vehicle body 1 positioned over a passenger room 1a are closed. The back window 60 is disposed rearwards of the roof panel 5 and includes a back window frame 6 and a back window glass 7. The back window frame 6 is fixed to a driven elongated link 41 of a four node link mechanism by bolts and so on (not shown). The first displacement mechanism 81 and the second displacement mechanism 70 are disposed on each side of the vehicle. A rim portion of the back window glass 7 is contacted to the back window frame 6 across its all circumference from inside of the passenger room 1a. A seal member (not shown) is disposed inside of the back window frame 6 and water-tightness between the back window glass 7 and the back window frame 6 is held.

As shown in FIG. 1, the roof panel 5, the back window frame 6 and the back window glass 7 are supported on the first displacement mechanism 81. The first displacement mechanism 81 constituted by a four node link mechanism for displacing the roof panel 5 and the back window frame 6. The first displacement mechanism 81 includes a fixed short link (a base link) 11 which is fixed to the vehicle body 1 and which is extended in the longitudinal direction of the vehicle body 1. A front end portion of the fixed short link 11 is rotatably connected to one end portion of a drive elongated link 21 by a fixed axis 12. An axis 22 is provided on the other end portion of the drive elongated link 21 and one end portion of a short link 31 is rotatably mounted on the axis 22. The other end portion of the short link 31 is rotatably connected to one end portion of the driven elongated link 41 by an axis 32. The other end portion of the driven elongated link 41 is rotatably connected to a fixed axis which is fixed to the fixed short link 31. A driving motor 82 is mounted on the fixed short link 11 and a gear portion 83 which is driven by the driving motor 82 via a pinion is formed on one end portion of the drive elongated link 21. Thereby, the drive elongated link 21 can be rotated around the fixed axis 12.

Figure 4:
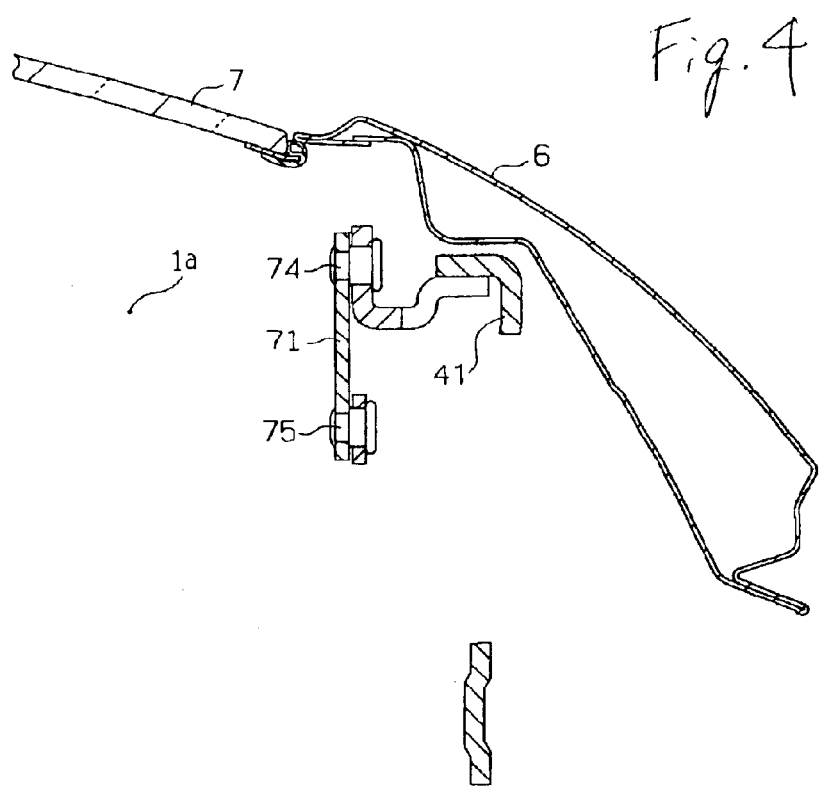
FIG. 4 is a cross-sectional view taken on line A—A of FIG. 1.
Figure 5:
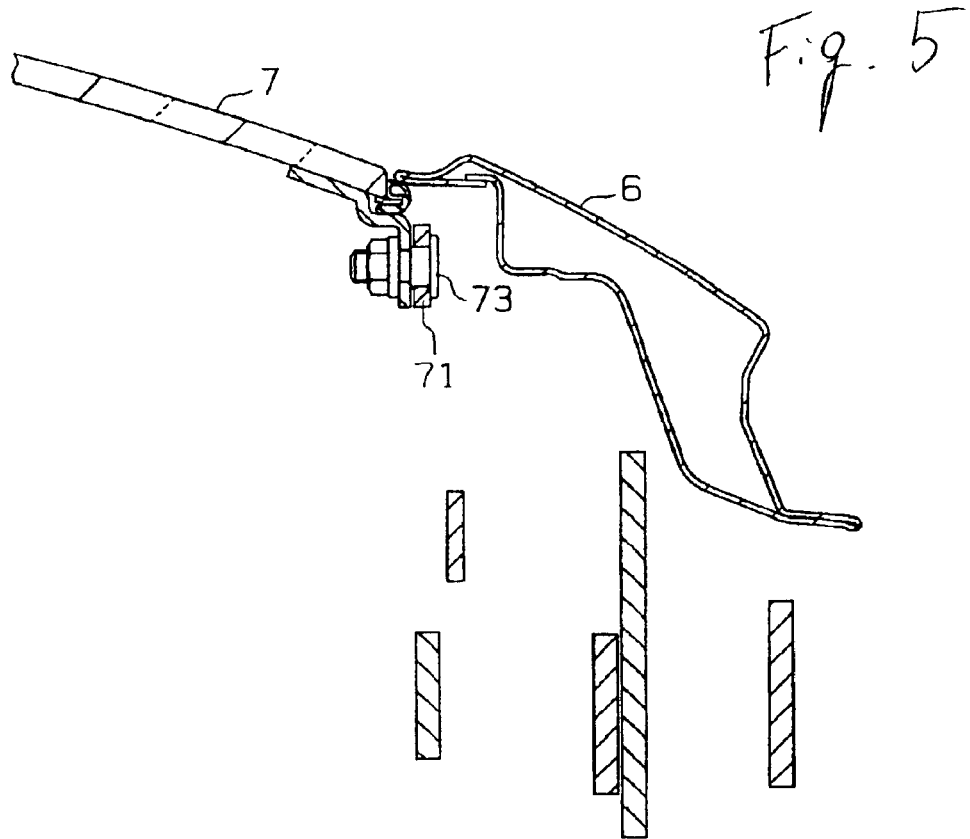
FIG. 5 is a cross-sectional view taken on line B—B of FIG. 1.

As shown in FIG. 1, the back window glass 7 is suspended by links (a first link and second link) 71, 72 in relation to the driven elongated link 41. One end of each of the links 71, 72 is connected to the back window glass 7 by glass mounting pins 73 and the other end of each of the links 71, 72 is connected to the driven elongated link 41 by link connecting pins 74. Thereby, the back window glass 7, the links 71, 72 and the driven elongated link 41 are formed of approximately parallelogram. FIG. 4 shows a cross sectional shape of a connecting portion between the link 71 and the driven elongated link 41 and FIG. 5 shows a cross sectional shape of a connecting portion between the links 71, 72 and the back window glass 7. As shown in FIG. 5, back window glass 7 is suspended on the back window frame 6 via the glass mounting pins 73 and the links 71, 72.

As shown in FIG. 4, the back window glass 7 contacts to the back window frame 6 from the inside of the passenger room 1a. Further, as shown in FIG. 4, the link 71 is rotatably connected to the driven elongated link 41 by the link connecting pins 74 via a stay. One end of a rod 76 is connected to a projecting portion provided on the link 71 by a pin 75. The other end of the rod 76 is connected to a fixed pin 77 of a rod bracket 78 which is fixed to the vehicle body 1.

The operation of the roof opening and closing device 80 having the above structure will now be described. The roof opening and closing device 80 displaces the roof panel 5 and the back window 60 from their mounting position to their storage position through the condition shown in FIG. 2 in response to the operation of the driving motor 82. In this operation, since the back window frame 6 is fixed to the driven elongated link 41 and displaces with the driven elongated link 41 in a body, the position of the back window frame 6 in the storage position shown in FIG. 3 inverts with approximately 180 degree in relation to the mounting position shown in FIG. 1 by the movement of the four nodes link mechanism.

When the driving motor 82 mounted on the fixed short link 11 is driven, the pinion is driven and the drive gear 83 provided on the drive elongated link 21 is rotated around the fixed axis 12. Thereby, the drive elongated link 21 is raised up. When the drive gear 83 is further rotated, the roof panel 5 and the back window 60 are displaced to the storage position shown in FIG. 3 through the condition shown in FIG. 2. As the drive elongated link 21 rotates, the rod 76 pushes the link 71 through the pin 75 and the above mentioned parallelogram is expanded. Thereby, the position of the back window glass 7 is displaced toward the center of the four node link mechanism approximately parallel. When the physical relationship between the back window frame 6 and the roof panel 5 inverted in the vertical direction and the roof panel 5 and the back window 60 come to the storage position, the back window glass 7 is displaced from the position shown by chain double-dashed line a in FIG. 3 to the position shown by solid line. Thereby, a space in a luggage room 90 for luggage can be enlarged.

Figure 6:
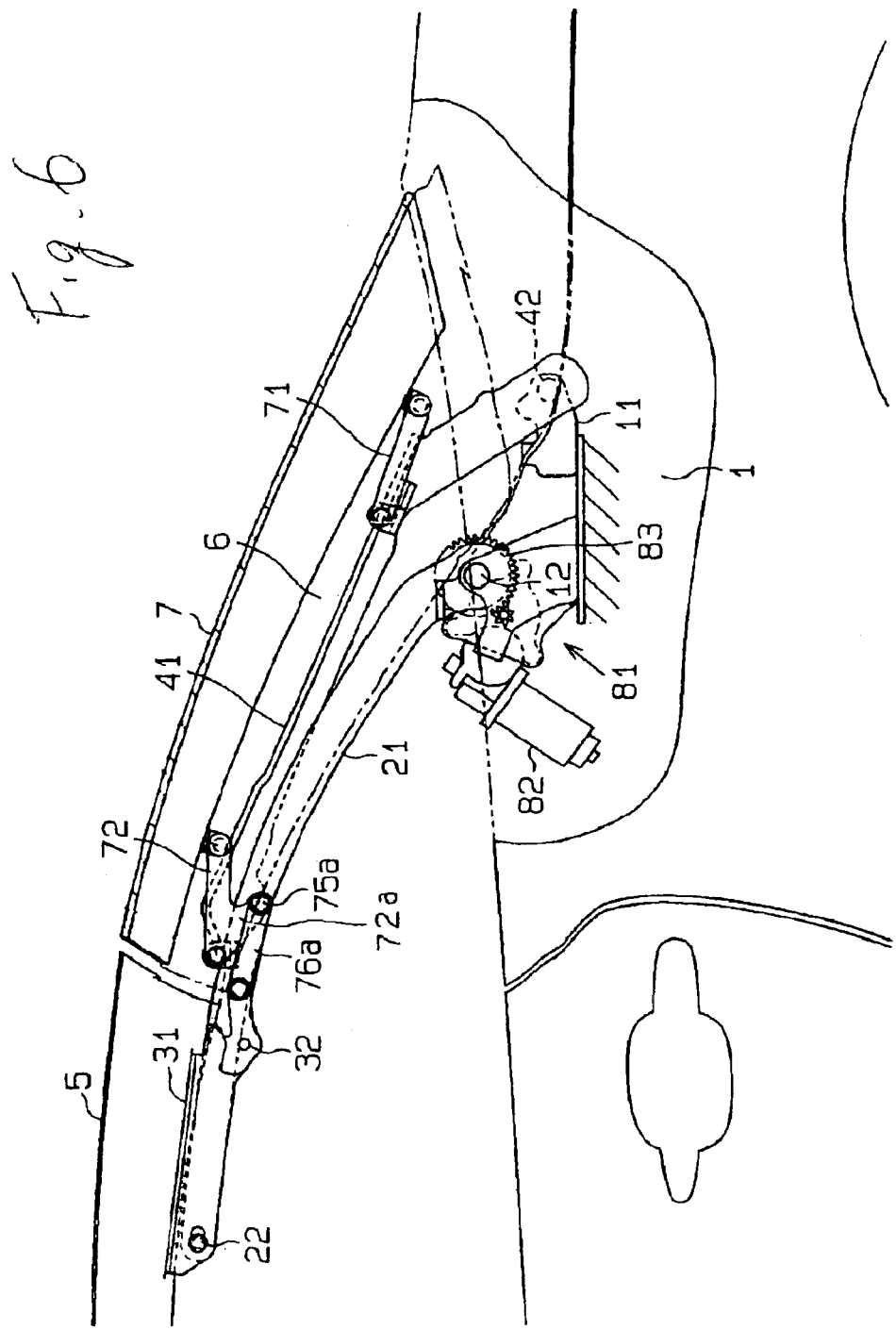
FIG. 6 is a side view of a roof opening and closing device according to a second embodiment of the present invention.

FIG. 6 shows a second embodiment of the present invention. In the second embodiment, a projection portion 72a is provided on the link 72 and a pin 75a is provided on a top end of the projection portion 75a. One end of the rod 76a is connected to the pin 75a and the other end of the rod 76a is rotatably connected on the driven elongated link 21. Thereby, the same effects of the second displacement mechanism 81 as in the first embodiment can be obtained.

As mentioned above, since the back window glass can be stowed at the high position in the luggage room when the roof panel and the back window glass displaces to the storage position in the luggage room, a space in a luggage room for luggage can be enlarged.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A roof opening and closing device comprising:

a roof panel for opening and closing a roof of a vehicle body and disposed over the vehicle for closing the roof at a mounting position of the roof panel;

a back window having a back window frame and a back window glass and disposed rearwards of the roof panel at a mounting position of the back window;

a first displacement mechanism for displacing the roof panel and the back window from their respective mounting positions to a storage position stowed in a luggage room in order to open the roof; and a second displacement mechanism for contacting a front end portion and a rear end portion of the back window glass in the longitudinal direction of the vehicle body to the back window frame at the mounting position of the roof panel and the back window and for displacing the front end portion and the rear end portion of the back window glass in relation to the back window frame; and wherein the first displacement mechanism includes a base link which is fixed to the vehicle body, an elongated link which is connected to a driving mechanism, and a short link which is fixed to the roof panel.

2. A roof opening and closing device according to claim 1, wherein the second displacement mechanism includes first and second links which support the back window glass movably in relation to the elongated link and at least one of the first link and the second link is connected to the base link or the back window frame.

* * * * *